United States Patent
Nishio et al.

(10) Patent No.: US 9,261,261 B2
(45) Date of Patent: Feb. 16, 2016

(54) ILLUMINATION SYSTEM

(71) Applicant: OLYMPUS CORPORATION, Tokyo (JP)

(72) Inventors: Masahiro Nishio, Hachioji (JP); Takeshi Ito, Hino (JP); Eiji Yamamoto, Musashimurayama (JP)

(73) Assignee: OLYMPUS CORPORATION, Tokyo (JP)

( * ) Notice: Subject to any disclaimer, the term of this patent is extended or adjusted under 35 U.S.C. 154(b) by 97 days.

(21) Appl. No.: 14/028,854

(22) Filed: Sep. 17, 2013

(65) Prior Publication Data

US 2014/0016345 A1      Jan. 16, 2014

Related U.S. Application Data

(63) Continuation of application No. PCT/JP2012/057359, filed on Mar. 22, 2012.

(30) Foreign Application Priority Data

Mar. 24, 2011 (JP) ................................. 2011-066714
Mar. 24, 2011 (JP) ................................. 2011-066715

(51) Int. Cl.
*G01J 1/00* (2006.01)
*F21V 17/10* (2006.01)
(Continued)

(52) U.S. Cl.
CPC ............. *F21V 17/10* (2013.01); *G01J 1/0219* (2013.01); *G01J 1/0271* (2013.01); *G01J 1/0407* (2013.01);
(Continued)

(58) Field of Classification Search
CPC ............. G01J 3/10; G01J 3/28; G01J 3/0218; G01J 3/027
USPC ................................................. 356/121–123
See application file for complete search history.

(56) References Cited

U.S. PATENT DOCUMENTS 3,777,562 A * 12/1973 Clingman, Jr. ................... 374/37
4,487,481 A * 12/1984 Suzawa ............................ 349/67
(Continued)

FOREIGN PATENT DOCUMENTS

EP    2 130 488 A1   12/2009
JP    58-30473 A     2/1983
(Continued)

OTHER PUBLICATIONS

Extended Supplementary European Search Report dated Aug. 14, 2014 from related European Application No. 12 76 0709.1.
(Continued)

*Primary Examiner* — Kara E Geisel
*Assistant Examiner* — Hina F Ayub
(74) *Attorney, Agent, or Firm* — Scully, Scott, Murphy & Presser, P.C.

(57) ABSTRACT

An illumination system includes a light source device configured by an excitation light source, a light guiding member and a wavelength converter that are connected in order, and an operation check device. The system further includes: a connector configured to directly and physically connect the operation check device to a light signal emitting end which includes the wavelength converter; a detector configured to detect a light signal emitted from the light signal emitting end when the light signal emitting end and the operation check device are connected by the connector; and an operation determiner configured to determine the operations of the excitation light source, the light guiding member, and the wavelength converter by a detection result in the detector.

16 Claims, 11 Drawing Sheets

(51) Int. Cl.

| | |
|---|---|
| *G01J 3/02* | (2006.01) |
| *G01J 1/02* | (2006.01) |
| *G01J 1/42* | (2006.01) |
| *G01J 5/04* | (2006.01) |
| *G01J 1/04* | (2006.01) |
| *G01J 1/16* | (2006.01) |
| *G01J 5/02* | (2006.01) |
| *F21V 8/00* | (2006.01) |

(52) U.S. Cl.
 CPC ................ *G01J 1/0488* (2013.01); *G01J 1/16* (2013.01); *G01J 1/4228* (2013.01); *G01J 1/4257* (2013.01); *G01J 3/027* (2013.01); *G01J 3/0264* (2013.01); *G01J 3/0291* (2013.01); *G01J 5/025* (2013.01); *G01J 5/041* (2013.01); *G02B 6/0006* (2013.01); *G01J 3/0218* (2013.01)

(56) References Cited

U.S. PATENT DOCUMENTS

| | | | | |
|---|---|---|---|---|
| 5,231,289 | A * | 7/1993 | Kita et al. ................. | 250/338.1 |
| 5,329,353 | A * | 7/1994 | Ichimura et al. ............ | 356/328 |
| 5,446,285 | A * | 8/1995 | Choi ........................ | 250/338.2 |
| 5,798,518 | A * | 8/1998 | Coleman et al. ............ | 250/205 |
| 5,894,352 | A * | 4/1999 | Morton ...................... | 356/432 |
| 6,734,958 | B1 | 5/2004 | MacKinnon et al. | |
| 2001/0019446 | A1 | 9/2001 | Hartung | |
| 2003/0107724 | A1 * | 6/2003 | Hashimoto et al. ............ | 356/45 |
| 2005/0213092 | A1 * | 9/2005 | MacKinnon et al. ......... | 356/336 |
| 2007/0177161 | A1 * | 8/2007 | Ishii et al. .................... | 356/614 |
| 2008/0197300 | A1 | 8/2008 | Kayser et al. | |
| 2009/0002707 | A1 * | 1/2009 | Berger ........................ | 356/430 |
| 2009/0213371 | A1 * | 8/2009 | Goodyer et al. ............. | 356/319 |
| 2009/0257114 | A1 * | 10/2009 | Fujiwara et al. ............. | 359/326 |
| 2009/0296018 | A1 | 12/2009 | Harle et al. | |
| 2011/0050435 | A1 * | 3/2011 | Katayama et al. ........... | 340/635 |
| 2011/0316606 | A1 * | 12/2011 | Ladurner et al. ............. | 327/378 |

FOREIGN PATENT DOCUMENTS

| | | |
|---|---|---|
| JP | 59-42532 A | 3/1984 |
| JP | 2008-026698 A | 2/2008 |
| JP | 2008-122838 A | 5/2008 |
| JP | 2008-224478 A | 9/2008 |
| JP | 2009-140874 A | 6/2009 |
| JP | 2009-183449 A | 8/2009 |
| JP | 2009-541950 A | 11/2009 |

OTHER PUBLICATIONS

International Search Report dated May 29, 2012 issued in PCT/JP2012/057359.

Japanese Office Action dated Feb. 3, 2015 from related Japanese Application No. 2011-066714, together with an English language translation.

Japanese Office Action dated Feb. 3, 2015 from related Japanese Application No. 2011-066715, together with an English language translation.

\* cited by examiner

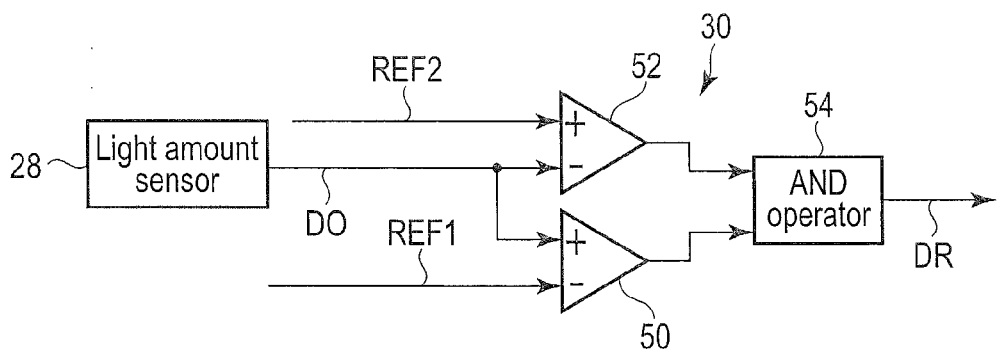
F I G. 5
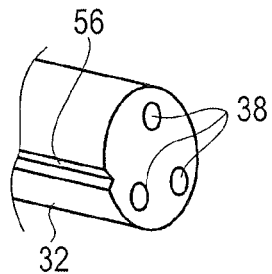
F I G. 6A
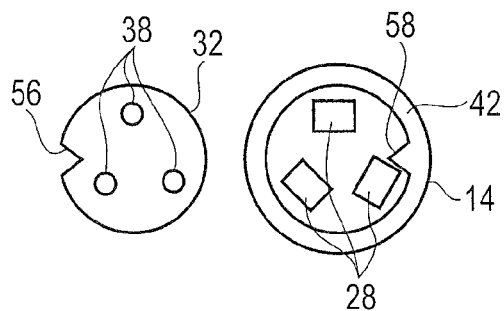
F I G. 6B

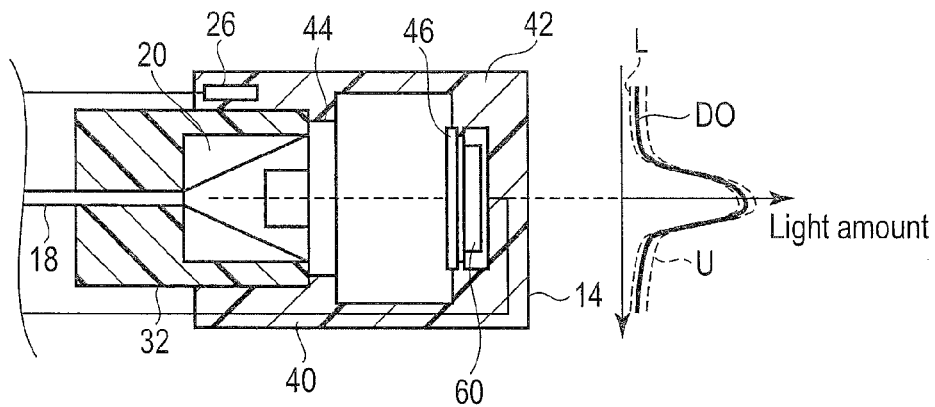
F I G. 7
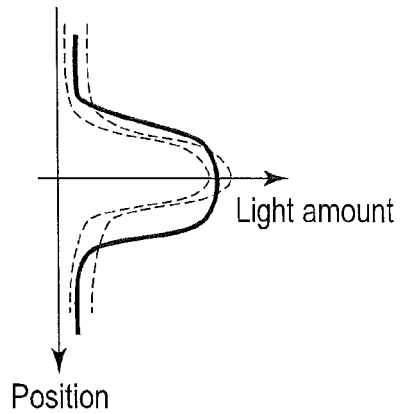
F I G. 8A
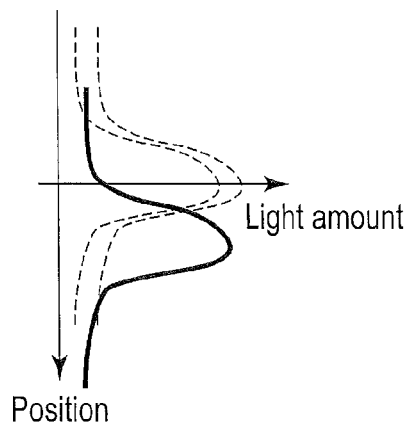
F I G. 8B

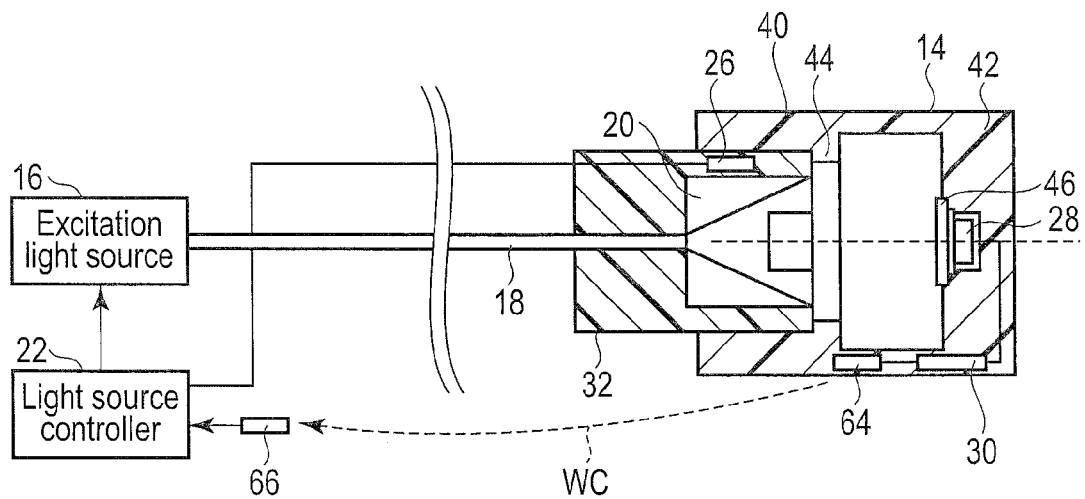
F I G. 11
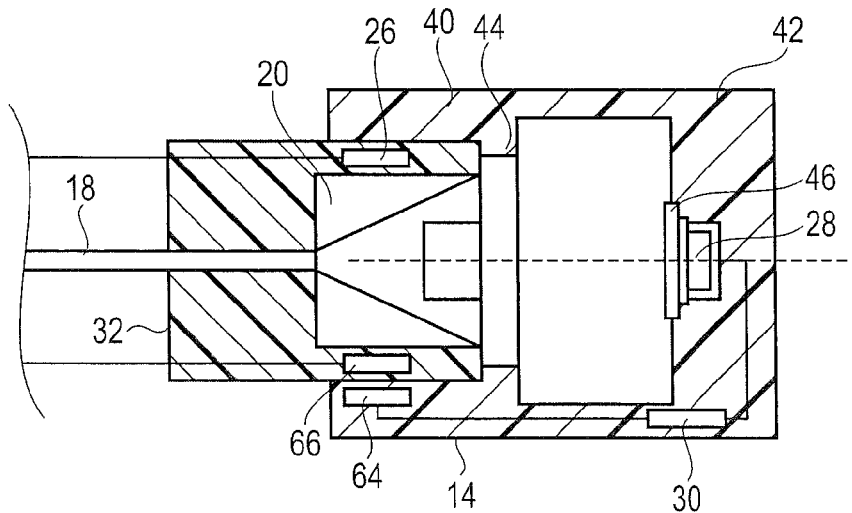
F I G. 12

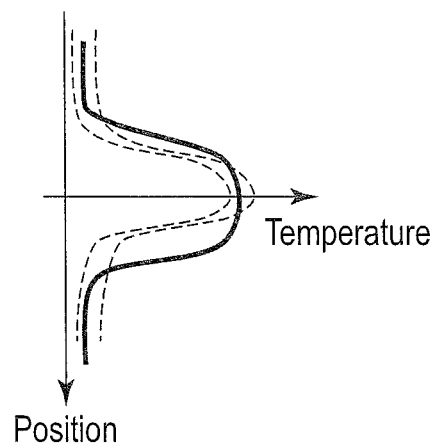
F I G. 19A
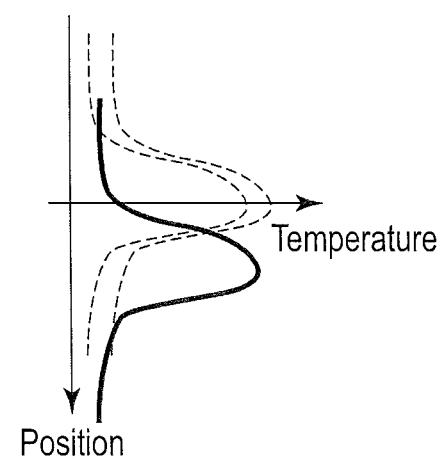
F I G. 19B

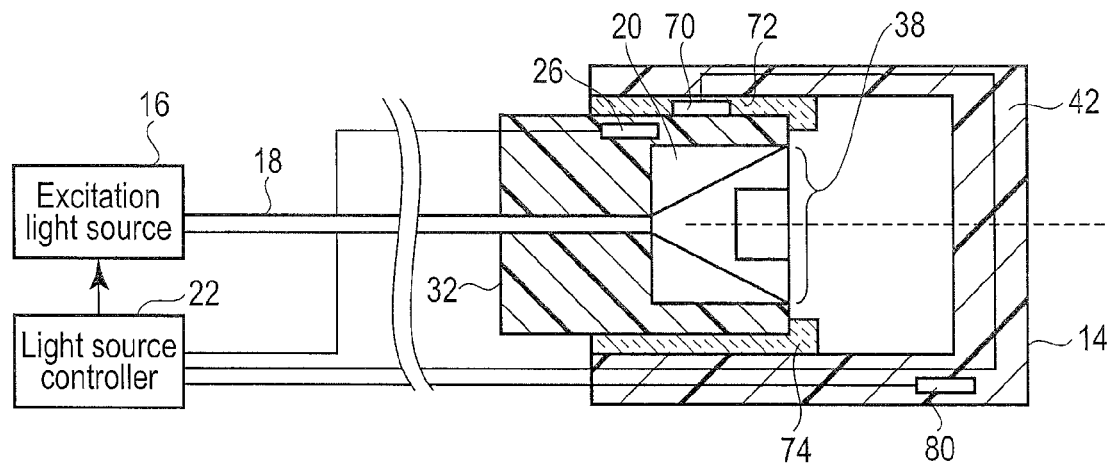
F I G. 20
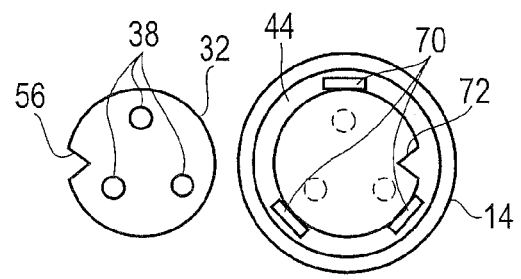
F I G. 21

ILLUMINATION SYSTEM

CROSS-REFERENCE TO RELATED APPLICATIONS

This is a Continuation Application of PCT Application No. PCT/JP2012/057359, filed Mar. 22, 2012, which was published under PCT Article 21(2) in Japanese.

This application is based upon and claims the benefit of priority from prior Japanese Patent Applications No. 2011-066714 and NO. 2011-066715, both filed Mar. 24, 2011, the entire contents of which are incorporated herein by reference.

BACKGROUND OF THE INVENTION

1. Field of the Invention

The present invention relates to an illumination system which illuminates an object to be illuminated.

2. Description of the Related Art

For example, in Jpn. Pat. Appln. KOKAI Publication No. 2008-26698, there is disclosed a light emitting device which is a light source device having a constitution capable of detecting disconnection with high accuracy. This light source device includes a light source having a semiconductor light emitting element to emit light (for example, excitation light), a lens which condenses the light emitted from the semiconductor light emitting element, a connector on which the light is condensed by the lens, a light guiding member connected to the connector, and an optical part disposed at a tip of the light guiding member. The light guiding member guides the light condensed on the connector. An example of the light guiding member is an optical fiber. The light is guided to the optical part by the light guiding member.

Moreover, the above light source device further includes a light branching member, which is interposed between the lens and the connector, to branch the reflected light returned from the optical part, and a light receiving element which receives the reflected light branched by the light branching member. The light receiving element is also a detecting section which detects the reflected light to detect the presence/absence of a failure of the light source device, for example, the disconnection of the light guiding member.

Jpn. Pat. Appln. KOKAI Publication No. 2008-26698 described above uses a constitution which detects reflected light branched by a light branching member to detect a failure such as disconnection of a light guiding member. However, detection items to be detected by such reflected light are limited, and when the measurement items are increased for the purpose of precisely detecting the failure, it is necessary to mount detectors on a light source device, which brings about an increase in the size of the device.

BRIEF SUMMARY OF THE INVENTION

The present invention has been developed in view of the above respects, and an object thereof is to provide an illumination system which can detect a failure of the light source device without increasing the size of the light source device.

According to an aspect of the invention, there is provided an illumination system comprising:

a light source device including an excitation light source configured to emit excitation light, a light guiding member configured to guide the excitation light emitted from the excitation light source, and a wavelength converter configured to convert the excitation light guided by the light guiding member to illumination light having a desired wavelength and emitting the illumination light to an object to be illuminated, wherein the excitation light source, the light guiding member and the wavelength converter are connected in order;

an operation check device configured to check a normal operation of the light source device;

a connector configured to directly and physically connect the operation check device to a light signal emitting end which includes the wavelength converter in the light source device;

a detector configured to detect at least one of a light signal emitted from the light signal emitting end and heat generation in the light signal emitting end when the light signal emitting end and the operation check device are connected by the connector; and an operation determiner configured to determine the operations of the excitation light source, the light guiding member, and the wavelength converter by a detection result in the detector.

According to the present invention, it is possible to provide an illumination system capable of determining the operations of an excitation light source, a light guiding member, and a wavelength converter, that is, capable of detecting a failure in a light source device, without the increase of the light source device in size.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a diagram showing another configuration example of the determination circuit according to the first embodiment;

FIG. 6A is a perspective view of a light signal emitting end in an illumination system according to a second embodiment of the present invention;

FIG. 6B is a diagram illustrating a configuration example of a wavelength conversion unit and an operation check device in the illumination system according to the second embodiment;

FIG. 7 is a diagram illustrating a configuration example of an operation check device according to a third embodiment of the present invention;

FIG. 8A is a graph showing an example of a distribution spread as compared with a detected light amount distribution found from a design value of the operation check device in FIG. 7;

FIG. 8B is a graph showing an example of a distribution having its center shifted relative to the detected light amount distribution found from the design value;

FIG. 11 is a diagram illustrating a configuration example of an illumination system according to a sixth embodiment of the present invention;

FIG. 12 is a diagram illustrating another configuration example of a wavelength conversion unit and an operation check device in the illumination system according to the sixth embodiment;

FIG. 19A is a graph showing an example of a distribution spread as compared with a detected temperature distribution found from a design value of the operation check device in FIG. 18;

FIG. 19B is a graph showing an example of a distribution having its center shifted relative to the detected temperature distribution found from the design value;

FIG. 20 is a diagram illustrating a configuration example of a wavelength conversion unit and an operation check device in an illumination system according to a twelfth embodiment of the present invention; and FIG. 21 is a diagram illustrating a configuration example of a wavelength conversion unit and an operation check device in an illumination system according to a thirteenth embodiment of the present invention.

DETAILED DESCRIPTION OF THE INVENTION

Hereinafter, embodiments of the present invention will be described in detail with reference to the drawings.

[First Embodiment]

Figure 1:
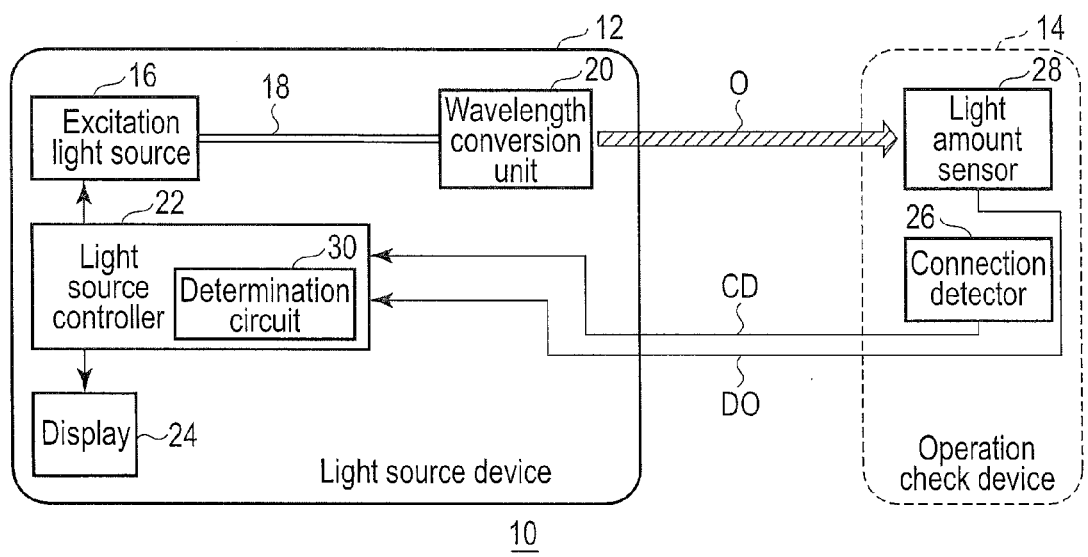
FIG. 1 is a block diagram showing the overall configuration of an illumination system according to a first embodiment of the present invention.

As shown in FIG. 1, an illumination system 10 according to the first embodiment of the present invention includes a light source device 12 and an operation check device 14. The light source device 12 illuminates an object to be illuminated by illumination light generated from excitation light. The operation check device 14 is connectable to or removable from the light source device 12. When the operation check device 14 is connected to the light source device 12 and the light source device 12 emits a light signal O, the operation check device 14 is used to check the state of the light source device 12, i.e., whether the light source device 12 fails, in accordance with the state of the emitted light signal O.

The light source device 12 is configured by an excitation light source 16, an optical fiber 18, and a wavelength conversion unit 20 that are connected in order. Here, the excitation light source 16 emits excitation light. The optical fiber 18 is a light guiding member which guides the excitation light emitted from the excitation light source 16. The wavelength conversion unit 20 is a wavelength converter which converts the excitation light guided by the optical fiber 18 to illumination light having a desired wavelength and emits the illumination light to the object to be illuminated. The light source device 12 further includes a light source controller 22 and a display 24. Here, the light source controller 22 controls the activation/deactivation and optical output of the excitation light source 16. The display 24 displays various information regarding the light source device 12.

Each component is described below in detail.

The excitation light source 16 is, for example, a laser device.

The wavelength conversion unit 20 includes a wavelength conversion member for wavelength conversion, for example, a fluorescent material. The excitation light emitted by the optical fiber 18 is applied to the fluorescent material. The fluorescent material converts the applied excitation light to fluorescence having a predetermined wavelength different from the wavelength of the excitation light. The fluorescence which is light having the predetermined wavelength is emitted from the wavelength conversion unit 20 as illumination light for illuminating the object to be illuminated. Actually, the fluorescent material does not totally convert the applied excitation light to fluorescence, but partly converts the excitation light to fluorescence. Thus, the wavelength conversion unit 20 emits not only the fluorescence but also the excitation light. Therefore, the wavelength conversion unit 20 actually emits the light signal O including the fluorescence which is the illumination light, and the excitation light which is not converted to fluorescence by the fluorescent material.

On the other hand, the operation check device 14 is removable from a light signal emitting end of the light source device 12 where the wavelength conversion unit 20 is located. The operation check device 14 has a connection detector 26 and a light amount sensor 28. Here, the connection detector 26 detects whether the operation check device 14 is connected in a proper positional relationship when the operation check device 14 is connected to the light signal emitting end. The light amount sensor 28 is a detector which detects the light signal O emitted from the wavelength conversion unit 20 when the operation check device 14 is connected to the light signal emitting end.

The light source controller 22 of the light source device 12 is configured to receive a connection detection signal CD from the connection detector 26 of the operation check device 14, and a detected light amount DO from the light amount sensor 28. The light source controller 22 includes a determination circuit 30 which is an operation determination circuit to determine whether the light source device 12 fails, i.e., determine the operations of the excitation light source 16, the optical fiber 18, and the wavelength conversion unit 20, in accordance with the detected light amount DO from the light amount sensor 28. The failure in the light source device 12 means, for example, the breaking of the optical fiber 18, and the leakage of the excitation light caused by the breaking of the optical fiber. Otherwise, the failure in the light source device 12 means, for example, the deterioration of emission efficiency of the excitation light or fluorescence caused by the breakdown of the wavelength conversion unit 20, and an unnecessary increase of the excitation light. The determination of whether the light source device 12 fails is described later.

In the illumination system 10 having the configuration described above, the operation check device 14 is used to determine the operation of the light source device 12 before the light source device 12 illuminates the object to be illuminated.

For example, this operation determination is automatically performed at least at the time of the application of electric power to the light source device 12 or after operational initialization of the light source device 12. In this operation determination, before the activation of the excitation light source 16, the light source controller 22 first ascertains in accordance with the connection detection signal CD from the connection detector 26 that the operation check device 14 is connected to the light signal emitting end of the wavelength conversion unit 20 of the light source device 12 in a proper positional relationship. After the connection is ascertained, the light source controller 22 activates the excitation light source 16 to emit the light signal O from the wavelength conversion unit 20. Using the detected light amount DO which is emitted light information detected by the light amount sensor 28 of the operation check device 14, the determination circuit 30 then determines the state of the light source device 12. In accordance with the determination, the light source controller 22 controls the optical output of the light signal O. That is, when the light source device 12 is determined to be dangerous or improper for activation, the light emission by the excitation light source 16 is inhibited, or the amount of the excitation light is limited. If the operation check device 14 is disconnected from the light signal emitting end, the light signal O under optical output control is emitted from the light signal emitting end. The determination result or, the control result of the optical output of the light signal O may be displayed on the display 24.

Now, specific configurations of the wavelength conversion unit 20 of the light source device 12 and the operation check device 14 are described.

Figure 2A:
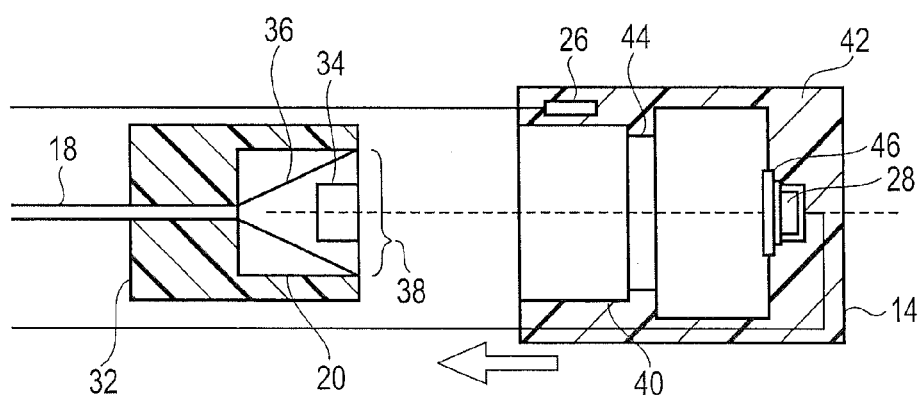
FIG. 2A is a sectional view showing a configuration example of a wavelength conversion unit and an operation check device in the illumination system according to the first embodiment.
Figure 2B:
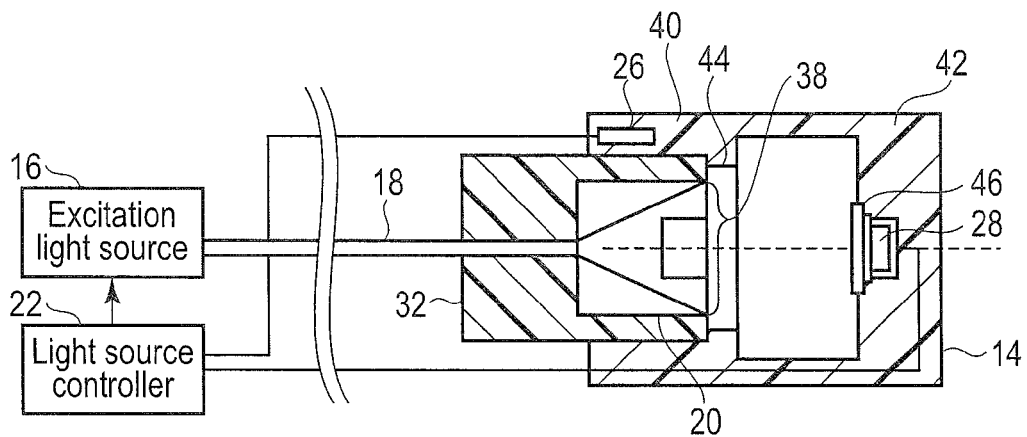
FIG. 2B is a sectional view showing the wavelength conversion unit and the operation check device in FIG. 2A that are connected to each other.

As shown in FIG. 2A and FIG. 2B, the light source device 12 has a light signal emitting end 32 for holding the optical fiber 18 and the wavelength conversion unit 20. The wavelength conversion unit 20 is located at the tip of the optical fiber 18 in the light signal emitting end 32. The wavelength conversion unit 20 has a fluorescent material 34 and a tapered mirror 36. Here, the fluorescent material 34 is a wavelength conversion member which converts the wavelength of the excitation light emitted through the optical fiber 18. The tapered mirror 36 is located in the rear of the fluorescent material 34 (on the side of the optical fiber 18). As described above, the light signal O including fluorescence which is the illumination light converted by the fluorescent material 34 and the excitation light which is not converted to fluorescence by the fluorescent material is emitted from an emission opening 38 provided at the tip of the light signal emitting end 32. The tapered mirror 36 is disposed to emit, from the emission opening 38, light traveling in directions other than the direction of the emission opening 38 out of the fluorescence converted by the fluorescent material 34. It should be appreciated that the wavelength conversion unit 20 is not limited to the structure described here and has only to be a structure that uses the fluorescent material 34.

The operation check device 14 is removable from the light signal emitting end 32, and includes the connection detector 26 and the light amount sensor 28. The operation check device 14 further includes a connector 40 and a light blocking cover 42. Here, the connector 40 directly and physically connects the light signal emitting end 32 and the operation check device 14. The light blocking cover 42 is a light blocking component which blocks, when connected, the light signal O emitted from the light signal emitting end 32.

The light amount sensor 28 is disposed on the inner surface of a concave in the light blocking cover 42, and is located to be in front of the emission opening 38 of the wavelength conversion unit 20. The connector 40 is provided with a projection 44 for alignment to keep a given distance between the light amount sensor 28 and the emission opening 38.

As shown in FIG. 2B, when the operation check device 14 is attached to the light signal emitting end 32 of the wavelength conversion unit 20, the emission opening 38 is covered with the light blocking cover 42. Therefore, the light emitted from the emission opening 38 does not leak out, and the light emitted from the emission opening 38 only enters the light amount sensor 28, so that the influence of external light can be eliminated. As the optical output is not yet controlled at the time of the operation determination of the light source device 12, a dangerous level of light may be emitted from the emission opening 38. However, such light, even if emitted, does not cause damage to, for example, a person outside because the emission opening 38 is covered with the light blocking cover 42.

The connection detector 26 detects whether the light blocking cover 42 and the light amount sensor 28 fixed thereto are placed at proper positions. The connection detector 26 may be configured to optically or electromagnetically detect access, or may be configured to electrically detect connection by the contact of electrodes.

A wavelength filter 46 which transmits the excitation light is provided in front of the light amount sensor 28 (on the side of the emission opening 38). Thus, when the operation check device 14 is connected to the light signal emitting end 32 and the excitation light source 16 emits excitation light, the light amount sensor 28 detects the state of the excitation light in a situation where the wavelength conversion unit 20 emits fluorescence and the excitation light. If the wavelength conversion unit 20 breaks down, the excitation light converted to fluorescence by the wavelength conversion unit 20 decreases, and the excitation light emitted as excitation light from the emission opening 38 increases. Therefore, the breakdown of the wavelength conversion unit 20 decreases the emission of fluorescence and increases the emission of excitation light. The excitation light has a high risk of causing damage when directly applied to human eyes or skin. Thus, the amount of excitation light is detected here. For example, if the optical fiber 18 has broken or deteriorated, the excitation light leaks out of the broken or deteriorated part, so that the amount of excitation light entering the wavelength conversion unit 20 decreases, and the amount of excitation light penetrating the wavelength conversion unit 20 also decreases.

Figure 3:
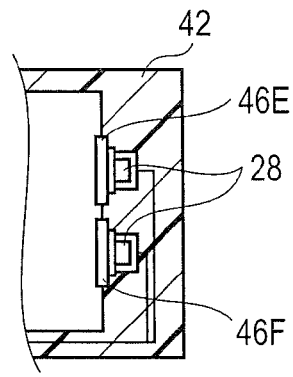
FIG. 3 is a sectional view showing another configuration example of the operation check device according to the first embodiment.

As shown in FIG. 3, an excitation light amount detector and a fluorescence amount detector may be configured by providing two light amount sensors 28 and disposing wavelength filters 46E and 46F which respectively transmit excitation light and fluorescence so that the amount of excitation light and the amount of fluorescence can be independently detected. That is, a small failure in the light source device 12 that is not shown in the change of the amount of excitation light may be detected as the change of the amount of fluorescence. Thus, the detection of the amount of fluorescence is meaningful.

Alternatively, a spectrometric detector may be used instead of the wavelength filter 46 and the light amount sensor 28. When such a spectrometric detector is used, the determination circuit 30 may only determine in accordance with the amount of the excitation light wavelength detected by the spectrometric detector, or may determine in accordance with relative intensity between the amount of the excitation light wavelength and the amount of the fluorescence wavelength.

Figure 4:
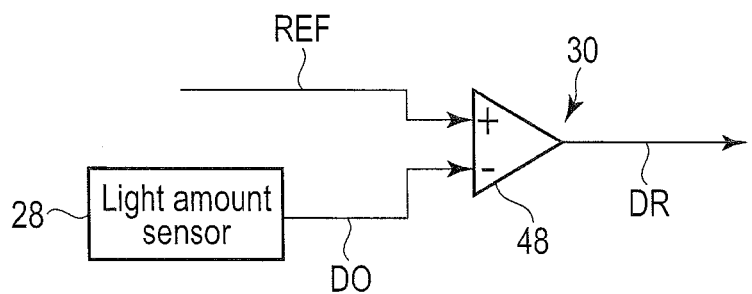
FIG. 4 is a diagram mainly showing a configuration example of a determination circuit in the illumination system according to the first embodiment.

As shown in FIG. 4, for example, the determination circuit 30 of the light source device 12 can be configured by a comparator 48 which compares a detected light amount DO from the light amount sensor 28 of the operation check device 14 with a reference voltage REF corresponding to a predetermined value. The output of the comparator 48 will be a determination result DR by the determination circuit 30. This determination circuit 30 determines whether the amount of excitation light is less than or equal to the predetermined value, and thereby determines whether the light source device 12 fails, i.e., determines the operations of the excitation light source 16, the optical fiber 18, and the wavelength conversion unit 20.

Alternatively, for example, as shown in FIG. 5, the determination circuit 30 of the light source device 12 may include two comparators 50 and 52 and an AND operator 54. Here, the comparator 50 compares the detected light amount DO from the light amount sensor 28 of the operation check device 14 with a reference voltage REF1 corresponding to a lower limit value within a predetermined range. The comparator 52 compares the detected light amount DO from the light amount sensor 28 with a reference voltage REF2 corresponding to an upper limit value within the predetermined range. The AND operator 54 takes an AND of the determination results by the comparators 50 and 52. The output of the AND operator 54 will be the final determination result DR of the determination circuit 30. This determination circuit 30 determines whether the amount of excitation light is within a predetermined range, and thereby determines whether the light source device 12 fails, i.e., determines the operations of the excitation light source 16, the optical fiber 18, and the wavelength conversion unit 20.

Here, the determination circuit 30 determines by one of the following methods:

(1) The determination circuit 30 determines that the operation is "proper" when the amount of the excitation light output to the outside through the wavelength conversion unit 20 is within the range of a light amount found in consideration of production variance of the excitation light source 16 and the wavelength conversion unit 20, or the determination circuit 30 determines that the operation is "improper" when the amount of the excitation light is not within the light amount range;

(2) The determination circuit 30 determines that the operation is "proper" when it is expected from the amount of excitation light in consideration of the deterioration of the wavelength conversion unit 20 that there is enough time before future deterioration and danger, or the determination circuit 30 determines that the operation is "improper" when it is expected that there is not enough time; and (3) The determination circuit 30 determines that it is "dangerous" when the wavelength conversion unit 20 breaks down and the amount of the excitation light output from the emission opening 38 of the wavelength conversion unit 20 influences other devices or the human body, or the determination circuit 30 determines that it is "safe" when the light amount has no influence.

For example, when the excitation light source 16 is a laser device as described above, excitation light which is laser light greater than or equal to the predetermined value may be emitted from the emission opening 38 if the light source device 12 fails. If the excitation light greater than or equal to the predetermined value is emitted, the user may be affected, and desired safety may not be maintained, or other devices may be affected. Thus, the determination circuit 30 determines that it is "safe" if the detected amount of excitation light is less than or equal to the predetermined value, or the determination circuit 30 determines that it is "dangerous" if the detected amount of excitation light is more than the predetermined value. The predetermined value which is the threshold of this determination can be based on, for example, the light amount detected by the light amount sensor 28 when the amount of the excitation light that influences other devices or the user of the light source device 12 is emitted. The threshold of this determination may be based on laser safety classes defined by, for example, international standards.

The failure in the light source device 12 means, for example, the breakdown of the wavelength conversion unit 20. If the wavelength conversion unit 20 breaks down, the excitation light converted to fluorescence by the wavelength conversion unit 20 decreases, and the excitation light emitted as excitation light from the emission opening 38 increases. Therefore, the breakdown of the wavelength conversion unit 20 decreases the emission of fluorescence and increases the emission of excitation light.

The "proper" operation and "improper" operation are decided, for example, by whether the excitation light source 16 and the wavelength conversion unit 20 can satisfy designed specifications, or by whether there is enough time before the wavelength conversion unit 20 becomes dangerous as a result of its deterioration in consideration of the deterioration of the wavelength conversion unit 20. The predetermined value which is the threshold of this determination can be found, for example, in consideration of production variance of the excitation light source 16 and the wavelength conversion unit 20 so that the excitation light source 16 and the wavelength conversion unit 20 satisfy the designed specifications. The predetermined value is lower than the predetermined value in the case of "safe" and "dangerous".

The determination circuit 30 obtains a determination result by previously setting, in the comparator 48 or the comparators 50 and 52, the reference voltage REF corresponding to the predetermined value for one of the case of "safe" and "dangerous" and the case of "proper" and "improper". It should be appreciated that the amount of excitation light (the optical output of the excitation light source 16) may be controlled in accordance with the combination of the determinations "safe" and "dangerous" and the determinations "proper" and "improper".

Although the determination is based on the amount of excitation light in the example described here, it is also possible to determine by the amount of fluorescence or by both the amounts of excitation light and fluorescence. Alternatively, it is also possible to use the spectrometric detector to determine by deriving the amount of excitation light and the amount of fluorescence from a spectrum. It is also possible to determine by the ratio between the amount of excitation light and the amount of fluorescence.

After the operation check device 14 is removed from the light source device 12 by user operation, the light source controller 22 controls the optical output of the excitation light source 16 in accordance with the previous determination result. When it is determined to be "safe" or the operation is determined to be "proper", the illumination light can be output. When it is determined to be "dangerous" or the operation is determined to be "improper", the excitation light source 16 is stopped, or the amount of excitation light is limited.

According to the illumination system 10 in the first embodiment described above, the light amount sensor provided in the operation check device 14 receives the light signal O when the operation check device 14 is connected to the light signal emitting end 32. It is thereby possible to determine the operations of the excitation light source 16, the optical fiber 18, and the wavelength conversion unit 20 in accordance with the detected light signal O, i.e., detect the failure in the light source device 12. Thus, in the present embodiment, the breakdown of the optical fiber 18 and the wavelength conversion unit 20 can be optically detected without the addition of new components to the optical system of the light source device 12, so that the increase of the light source device 12 in size can be prevented.

According to the present embodiment, the operation check device 14 has only to be connected to the light signal emitting end 32. The breakdown of the optical fiber 18 and the wavelength conversion unit 20 is optically detected by the configuration with a high degree of freedom in designing without the addition of new components to the optical system of the light source device 12. It is possible to inhibit any dangerous operation of the light source device 12 in the event of the detection of the breakdown. When no breakdown is detected and the light source device 12 is put into operation, the operation check device 14 is removed and therefore does not affect the operation and usability of the light source device 12.

According to the present embodiment, a determination is based on an optical detection result, which leads to a shorter time for the determination of a failure in the light source device 12 and to high response. Moreover, influence resulting from the failure is directly detected, which permits reliable detection.

[Second Embodiment]

In an illumination system 10 according to the second embodiment, a plurality of wavelength conversion units 20 are disposed in an light signal emitting end 32 of a light source device 12.

For example, in the example shown in FIG. 6A, three wavelength conversion units 20 are disposed in the light signal emitting end 32, and the light signal emitting end 32 includes three emission openings 38. Regarding the guiding of light to each of the wavelength conversion units 20, excitation light emitted from the excitation light source 16 may be branched and guided to the wavelength conversion units 20 by a plurality of optical fibers 18. Alternatively, excitation light emitted from the excitation light source 16 may be guided into the light signal emitting end 32 by one optical fiber 18, and branched to the wavelength conversion units 20 in the light signal emitting end 32.

In the configuration in which a plurality of wavelength conversion units 20 are disposed in the light signal emitting end 32 of the light source device 12, a cutout 56 is provided in the outer periphery of the light signal emitting end 32, and a protrusion 58 to be fitted into the cutout 56 is provided in the inner periphery of a light blocking cover 42 of an operation check device 14, as shown in FIG. 6A and FIG. 6B. A light amount sensor 28 is located to face each of the wavelength conversion units 20 when the operation check device 14 is connected to the light signal emitting end 32 to fit the protrusion 58 into the cutout 56. This ensures that the light amount of each of the wavelength conversion units 20 can be detected. When a plurality of wavelength conversion units 20 are provided in this way, a connector 40 preferably has a connection structure that uniquely decides a positional relationship between the light amount sensor 28 and the light signal emitting end 32.

[Third Embodiment]

As shown in FIG. 7, an illumination system 10 according to the third embodiment is equipped with a two-dimensional array light amount sensor 60 capable of light amount distribution measurement instead of the above-mentioned light amount sensor 28. A two-dimensional PD or an imaging element can be used as the two-dimensional array light amount sensor 60.

In this case, a determination circuit 30 determines that it is "safe" or the operation is "proper" if a light distribution characteristic (the distribution of a light amount DO) measured by the two-dimensional array light amount sensor 60 is located between a predetermined upper limit value U and a lower limit value L as compared with a distribution obtained from a design value. On the contrary, when a distribution spreads as shown in FIG. 8A as compared with the distribution obtained from the design value or when the center of the distribution is shifted as shown in FIG. 8B, the determination circuit 30 determines that it is "dangerous" or the operation is "improper".

If a color filter is provided instead of a wavelength filter 46, it is possible to use a configuration which determines by the distribution of each wavelength (each color). In this case, it is possible to determine by the respective distributions of excitation light and fluorescence.

The determination time can be reduced by finding a maximum light amount from the detection value of the measured light amount distribution and determining by this value rather than by comparing the detection value of the light amount distribution measured by the two-dimensional array light amount sensor 60 with the distribution obtained from the design value.

[Fourth Embodiment]

Figure 9:
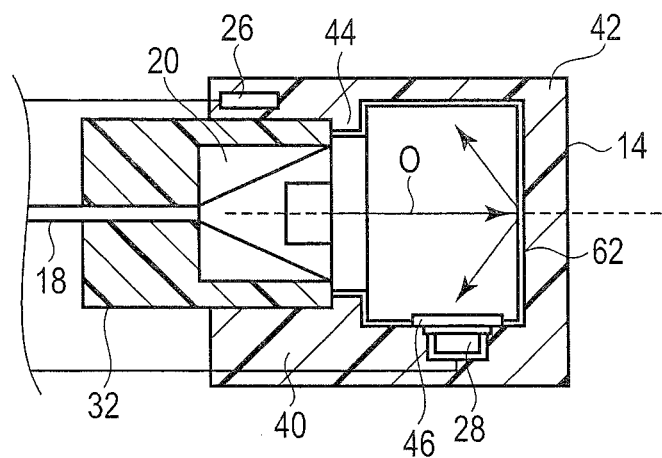
FIG. 9 is a diagram illustrating a configuration example of a wavelength conversion unit and an operation check device in an illumination system according to a fourth embodiment of the present invention.

As shown in FIG. 9, in an illumination system 10 according to the fourth embodiment, a scattering plate 62 is disposed inside a light blocking cover 42 of an operation check device 14, and a light amount sensor 28 is located in the place where a light signal O emitted from an emission opening 38 of a wavelength conversion unit 20 does not enter directly.

In this configuration, the light signal O emitted from the emission opening 38 is applied to the scattering plate 62, and reflected and scattered by the scattering plate 62 in various directions.

Therefore, even when the light signal O has a light distribution, the light signal O can be averaged and thus detected by the light amount sensor 28. Therefore, even when the light amount sensor 28 is not located in front of the emission opening 38 of the wavelength conversion unit 20, the status of the whole light signal O can be detected if the light amount sensor 28 is located to be able to measure the light amount of the light signal O scattered by the scattering plate 62.

In the second embodiment in which a plurality of wavelength conversion units 20 are disposed in the light signal emitting end 32 of the light source device 12, one light amount sensor 28 alone may be used as in the configuration according to the present embodiment instead of a plurality of light amount sensors 28. In this configuration, reflected and scattered light of the light signal O emitted by each of the wavelength conversion units 20 enters the light amount sensor 28. This ensures that the light amount of each of the wavelength conversion units 20 can be detected.

[Fifth Embodiment]

Figure 10:
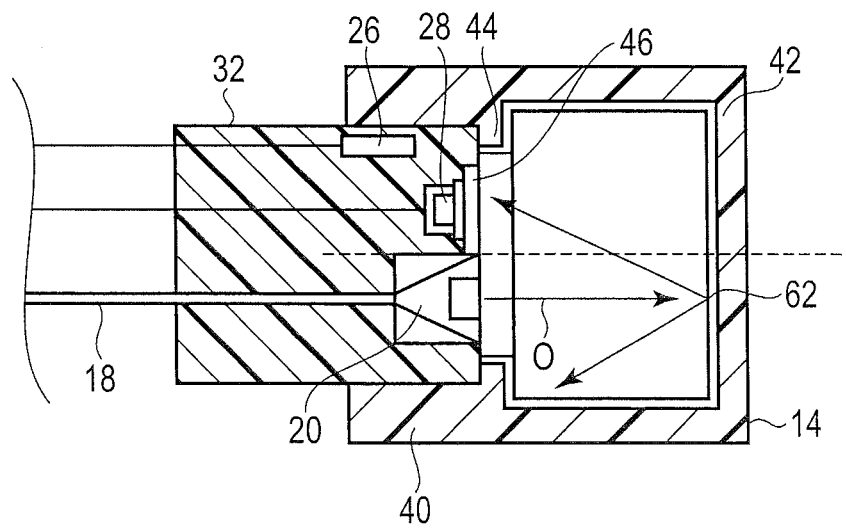
FIG. 10 is a diagram illustrating a configuration example of a wavelength conversion unit and an operation check device in an illumination system according to a fifth embodiment of the present invention.

As shown in FIG. 10, in an illumination system 10 according to the fifth embodiment, a light amount sensor 28 is not provided in an operation check device 14 but provided in a light signal emitting end 32 of a light source device 12. In this case, the operation check device 14 has a scattering plate 62 disposed inside a light blocking cover 42, as in the fourth embodiment.

In this configuration, a light signal O emitted from an emission opening 38 of a wavelength conversion unit 20 is reflected and scattered by the scattering plate 62 in the light blocking cover 42, and then enters the light amount sensor 28 provided in the light signal emitting end 32.

If the light source device 12 has an observation function, the light amount sensor 28 does not need to be additionally provided, and an imaging element that constitutes the observation function may be used for light amount detection. An imaging element with a color filter can separately detect excitation light and fluorescence, and can also detect a light distribution.

Although a connection detector 26 is located not in the operation check device 14 but in the light signal emitting end 32 of the light source device 12 in FIG. 10, the operation is similar to that when the connection detector 26 located in the operation check device 14. It should be appreciated that the connection detector 26 may also be located in the light signal emitting end 32 in the configurations according to the first to fourth embodiments. Conversely, it should be appreciated that the connection detector 26 may be located in the operation check device 14 in the present embodiment as well.

[Sixth Embodiment]

As shown in FIG. 11, an illumination system 10 according to the sixth embodiment transmits information from the operation check device 14 to the light source device 12 by wireless communication WC using a transmitter 64 which is an infrared, electromagnetic coupling, or radio wave wireless transmitter and a receiver 66 which is a wireless receiver.

In this case, a determination circuit 30 disposed in a light source controller 22 may be disposed between a light amount sensor 28 of the operation check device 14 and the transmitter 64. In this arrangement, a determination result has only to be transmitted as the contents of a wireless communication, so that a communication system can be simpler.

If a connection detector 26 is also disposed in a light signal emitting end 32 of the light source device 12, wired connection to the operation check device 14 can be eliminated.

As shown in FIG. 12, the receiver 66 may be provided at such a position in the light signal emitting end 32 that the transmitter 64 and the receiver 66 face each other when the operation check device 14 is connected to the light signal emitting end 32. In this case, the transmitter 64 and the receiver 66 can be low-power transmitter and receiver that are only operable within a short distance so that the operation check device 14 only operates when properly connected. This allows connection detection based on the operations of the transmitter 64 and the receiver 66. Consequently, the connection detector 26 can also be omitted.

The transmitter 64 and the receiver 66 may be a transmitter and a receiver capable of two-way wireless communication so that power transmitted from the light source device 12 by the transmitter and receiver is used for the operation in the operation check device 14 instead of the provision of a battery in the operation check device 14.

Although the connection detector 26 is disposed in the light signal emitting end 32 in FIG. 11 and FIG. 12, it should be appreciated that the connection detector 26 may be disposed in the operation check device 14.

[Seventh Embodiment]

An illumination system 10 according to the seventh embodiment uses a light amount sensor 28 as a photoelectric cell.

Thus, a light signal O which is not used for the actual illumination of an object to be illuminated and which is only used for determination can be converted to electric power and used for the operation of an operation check device 14.

[Eighth Embodiment]

Figure 13:
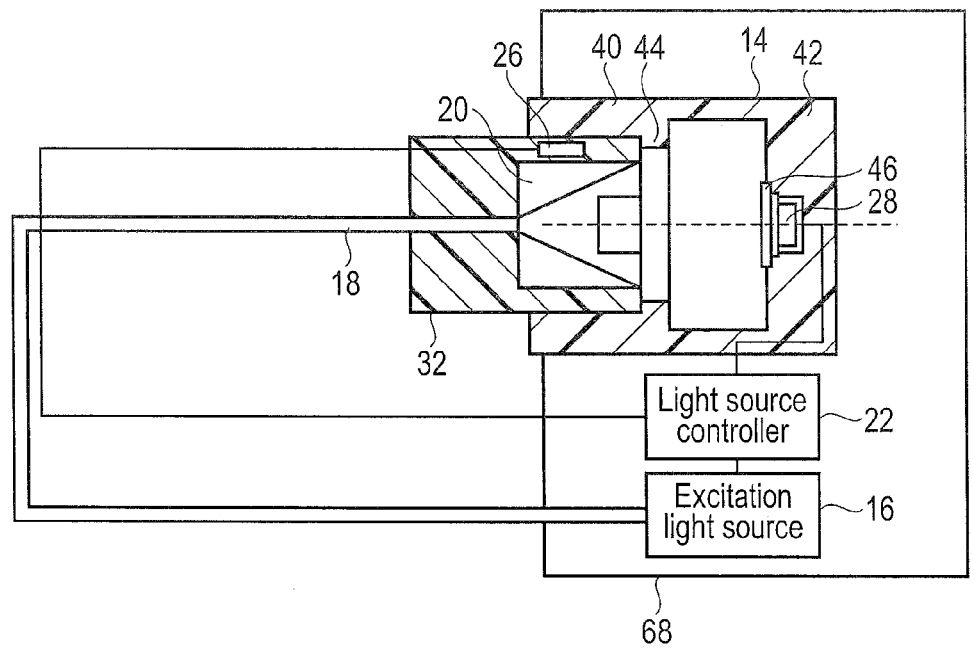
FIG. 13 is a diagram illustrating a configuration example of an illumination system according to an eighth embodiment of the present invention.

As shown in FIG. 13, in an illumination system 10 according to the eighth embodiment, an operation check device 14 is incorporated in a light source device body 68 which has an excitation light source 16 and a light source controller 22 therein.

This can eliminate the work of connecting the operation check device 14 and the light source controller 22, and also eliminate the fear of the loss of the operation check device 14.

Although a connection detector 26 is disposed in a light signal emitting end 32 in FIG. 13, the connection detector 26 may be disposed in the operation check device 14.

[Ninth Embodiment]

Figure 14:
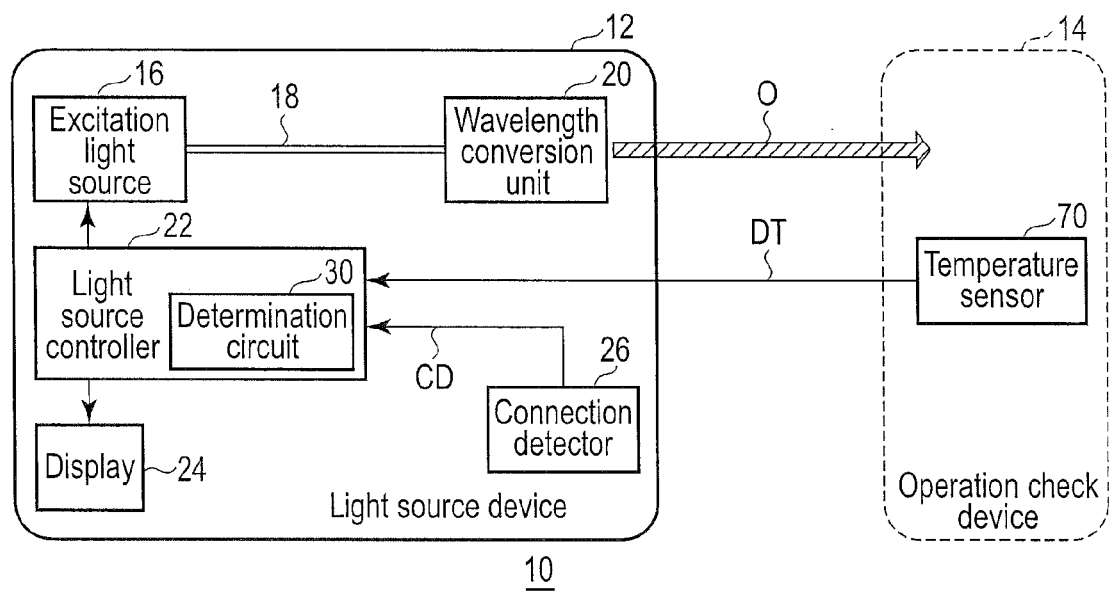
FIG. 14 is a block diagram showing the overall configuration of an illumination system according to a ninth embodiment of the present invention.

As shown in FIG. 14, in an illumination system 10 according to the ninth embodiment of the present invention, an operation check device 14 is provided with, instead of the above-mentioned light amount sensor 28, a temperature sensor 70 which is a detector for detecting heat generation in a light signal emitting end 32 when the operation check device 14 is connected to the light signal emitting end 32.

In the present embodiment, a determination circuit 30 in a light source controller 22 of a light source device 12 determines whether the light source device 12 fails, i.e., determines the operations of an excitation light source 16, an optical fiber 18, and a wavelength conversion unit 20 in accordance with a detected temperature DT which is heat generation in the light signal emitting end 32 detected by the temperature sensor 70.

Although a connection detector 26 is provided in the light source device 12 in FIG. 14, the connection detector 26 may be provided in the operation check device 14.

Figure 15A:
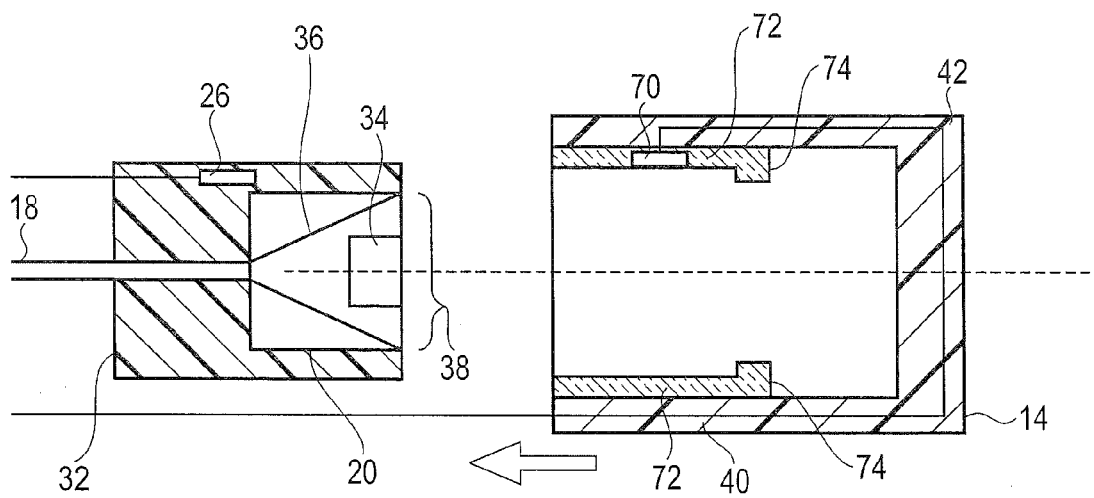
FIG. 15A is a sectional view showing a configuration example of a wavelength conversion unit and an operation check device in the illumination system according to the ninth embodiment.
Figure 15B:
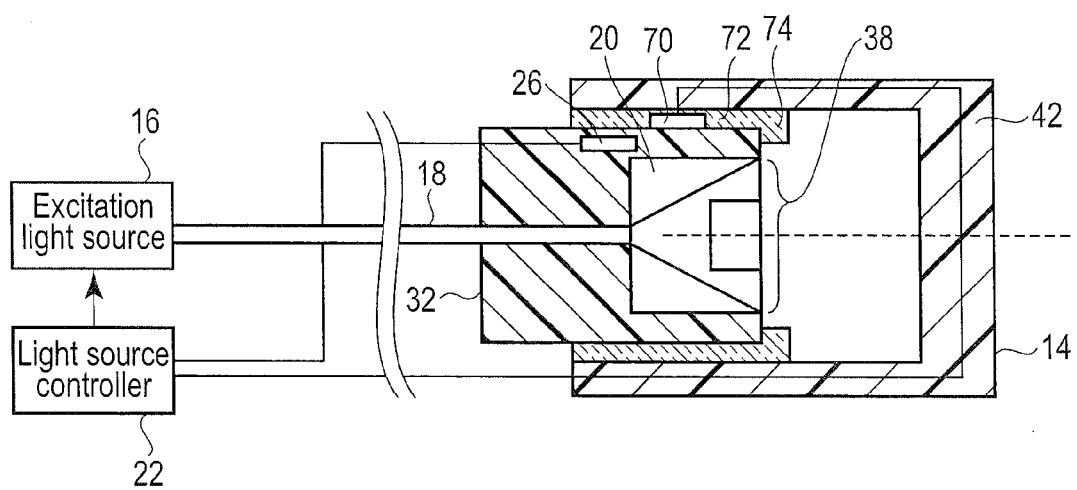
FIG. 15B is a sectional view showing the wavelength conversion unit and the operation check device in FIG. 15A that are connected to each other.

Specifically, the operation check device 14 is removable from the light signal emitting end 32 as shown in FIG. 15A, and includes the temperature sensor 70. The temperature sensor 70 is located in the connector 40 to face the side surface of the light signal emitting end 32 of the light source device 12. In particular, the temperature sensor 70 is disposed in the place where the heat generation in the wavelength conversion unit 20 which is the heat generation source in the light signal emitting end 32 can be monitored, i.e., in the place where heat is well conducted from the wavelength conversion unit 20. Specifically, the temperature sensor 70 is located on the inner surface of the connector 40 so that the temperature sensor 70 comes into contact with the light signal emitting end 32 when the light signal emitting end 32 of the light source device 12 is inserted as shown in FIG. 15B. As a light signal O is not applied to the temperature sensor 70 in this place, a temperature rise caused by the light signal O can be prevented. Therefore, this place is preferable when a contact temperature sensor such as a thermocouple or a thermister is used as the temperature sensor 70.

In the present embodiment, a heat insulating material 72 having a low thermal conductivity is disposed around the temperature sensor 70 and on the inner surface of the connector 40 where the operation check device 14 comes into contact with the light signal emitting end 32 of the light source device 12. Thus, the temperature sensor 70 can accurately measure the temperature of the light signal emitting end 32 of the light source device 12, i.e., the temperature of the wavelength conversion unit 20 without being influenced by the heat generation and thermal diffusion of the operation check device 14. The heat insulating material 72 is provided with a projection 74 for alignment so that the light signal emitting end 32 is held at a position that allows the temperature sensor 70 to correctly detect the temperature of the wavelength conversion unit 20 in the light signal emitting end 32 when the operation check device 14 is connected to the light signal emitting end 32.

The connection detector 26 detects whether the operation check device 14 and the temperature sensor 70 fixed thereto are placed at proper positions. The connection detector 26 may be configured to optically or electromagnetically detect access, or may be configured to electrically detect connection by the contact of electrodes.

The determination circuit 30 of the light source device 12 can be similar to that in the first embodiment described above. That is, the determination circuit 30 can be configured by a comparator 48 which compares the detected temperature DT from the temperature sensor 70 of the operation check device 14 with a reference voltage REF corresponding to a predetermined value. The output of the comparator 48 will be a determination result DR by the determination circuit 30. This determination circuit 30 determines whether the detected temperature DT is less than or equal to the predetermined value, and thereby determines whether the light source device 12 fails, i.e., determines the operations of the excitation light source 16, the optical fiber 18, and the wavelength conversion unit 20.

Alternatively, for example, the determination circuit 30 of the light source device 12 may include an AND operator. The determination circuit 30 uses two comparators 50 and 52 to compare the detected temperature DT from the temperature sensor 70 of the operation check device 14 with first and second reference voltages REF1 and REF2 corresponding to a lower limit value and an upper limit value within a predetermined range, and the AND operator calculates an AND of the determination results by the two comparators 50 and 52 to obtain the final determination result DR. This determination circuit 30 determines whether the detected temperature DT is within a predetermined range, and thereby determines whether the light source device 12 fails, i.e., determines the operations of the excitation light source 16, the optical fiber 18, and the wavelength conversion unit 20.

Here, the determination circuit 30 determines by one of the following methods:

(1) The determination circuit 30 determines that the operation is "proper" when the heat generation from the wavelength conversion unit 20 indicated by the detected temperature DT is within the range of heat generation (temperature range) found in consideration of production variance of the excitation light source 16 and the wavelength conversion unit 20, or the determination circuit 30 determines that the operation is "improper" when the heat generation is not within the heat generation range;

(2) The determination circuit 30 determines that the operation is "proper" when it is expected from the detected temperature DT that there is enough time before future deterioration and danger, or the determination circuit 30 determines that the operation is "improper" when it is expected the time is short;

(3) The determination circuit 30 determines that the operation is "proper" when it is predicted from the heat generation from the wavelength conversion unit 20 indicated by the detected temperature DT that the wavelength conversion unit 20 is operating in a condition assumed at the time of designing, or the determination circuit 30 determines that the operation is "improper" when the wavelength conversion unit 20 is operating in a condition that is not assumed. For example, the determination circuit 30 determines that the operation is "proper" when the detected temperature DT indicates heat (temperature) which is generated when the amount of excitation light penetrating the wavelength conversion unit 20 is within a designed range, or the determination circuit 30 determines that the operation is "improper" when the amount of excitation light is out of the designed range of heat generation;

(4) The determination circuit 30 determines that it is "dangerous" when the detected temperature DT indicates that the heat generated from the wavelength conversion unit 20 has brought the light signal emitting end 32 of the light source device 12 to a temperature that influences other devices or the user, or the determination circuit 30 determines that it is "safe" when there is no influence; and (5) The determination circuit 30 determines that it is "dangerous" when it is predicted from the heat (detected temperature DT) generated from the wavelength conversion unit 20 that the wavelength conversion unit 20 is operating in a dangerous condition, or the determination circuit 30 determines that it is "safe" when it is predicted that the wavelength conversion unit 20 is operating in a safe condition. For example, the determination circuit 30 determines that it is "dangerous" when the excitation light penetrating the wavelength conversion unit 20 has increased and heat generated by a dangerous light amount is detected.

The breakdown of the wavelength conversion unit 20, for example, the deterioration of a fluorescent material 34 deteriorates the transmittance of the excitation light when penetrating the wavelength conversion unit 20, and increases the amount of excitation light absorbed by the wavelength conversion unit 20. Thus, the calorific value is higher than in a normal condition in which the fluorescent material 34 has not deteriorated, i.e., in which the wavelength conversion unit 20 has not broken down. The temperature of the light signal emitting end 32 increases accordingly.

In contrast, as a result of the breakdown of the wavelength conversion unit 20 such that the fluorescent material 34 has deviated from the optical axes of the light source device 12 and the optical fiber 18 and the excitation light does not enter the fluorescent material 34, the amount of excitation light absorbed by the wavelength conversion unit 20 decreases. Consequently, the calorific value is reduced and the temperature of the light signal emitting end 32 is reduced as compared with the normal condition in which the fluorescent material 34 has not come off the light source device 12, i.e., in which the wavelength conversion unit 20 has not broken down.

If the optical fiber 18 has broken or deteriorated, the excitation light leaks out of the broken or deteriorated part, so that the amount of excitation light entering the wavelength conversion unit 20 decreases, the calorific value of the wavelength conversion unit 20 decreases.

Thus, when the temperature is out of a predetermined range, other devices or the user may be affected by the increase of the amount of excitation light leaking from the wavelength conversion unit 20 or the increase of the amount of excitation light leaking from the optical fiber 18.

Therefore, the determination circuit 30 determines whether it is "safe" or "dangerous" by whether the temperature of the light signal emitting end 32 detected by the temperature sensor 70 is less than or equal to a predetermined value or is within the predetermined range. The predetermined value or the predetermined range has only to be decided by the influence on the user or other devices, and, for example, can be found in consideration of the temperature of the light signal emitting end 32 resulting from the leakage of the excitation light of the wavelength conversion unit 20. The predetermined value or the predetermined range may otherwise be decided by a predicted value or by, for example, international standards when the light source device 12 is designed.

The "proper" operation and "improper" operation are decided, for example, by whether the excitation light source 16 and the wavelength conversion unit 20 can satisfy designed specifications, or by whether there is enough time before the wavelength conversion unit 20 becomes dangerous as a result of its deterioration in consideration of the deterioration of the wavelength conversion unit 20. The predetermined value or the predetermined range which is the threshold of this determination can be found, for example, in consideration of production variance of the excitation light source 16 and the wavelength conversion unit 20 so that the excitation light source 16 and the wavelength conversion unit 20 satisfy the designed specifications. The predetermined value or range is lower than the predetermined value or range in the case of "safe" and "dangerous".

The determination circuit 30 obtains a determination result by previously setting, in the comparator 48 or the comparators 50 and 52, the reference voltage REF corresponding to the predetermined value for one of the case of "safe" and "dangerous" and the case of "proper" and "improper". It should be appreciated that the amount of excitation light (the optical output of the excitation light source 16) may be controlled in accordance with the combination of the determinations "safe" and "dangerous" and the determinations "proper" and "improper".

Figure 16:
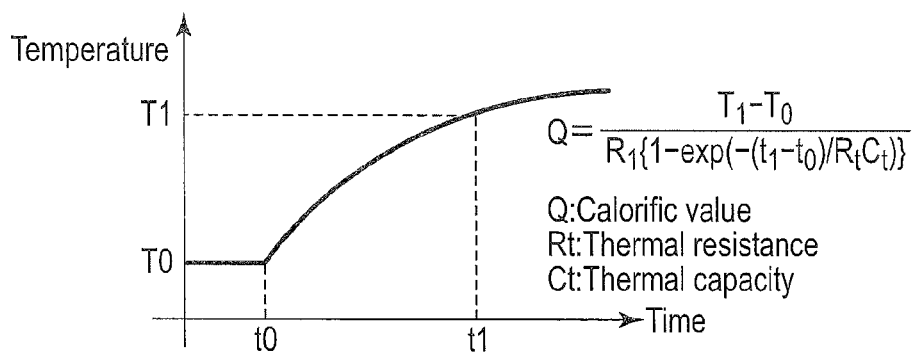
FIG. 16 is a graph illustrating how to find a calorific value from a temperature change.

Although the determination is based on the detected temperature DT in the example described here, a calorific value may be predicted from the detected temperature DT, and the predicted value may be used for determination. In this case, the calorific value can be found by a temperature change and by thermal resistance Rt and thermal capacity Ct of the light signal emitting end 32, as shown in FIG. 16. The thermal resistance is a value ranging from the wavelength conversion unit 20 to the temperature sensor 70. The thermal capacity is the value of the light signal emitting end 32. For these values, designed values or experimental values can be used.

According to the illumination system 10 in the ninth embodiment described above, the temperature sensor 70 provided in the operation check device 14 detects the temperature as the heat generation in the light signal emitting end 32 when the operation check device 14 is connected to the light signal emitting end 32. It is thereby possible to determine, in accordance with the detected temperature, the operations of the excitation light source 16, the optical fiber 18, and the wavelength conversion unit 20, i.e., detect the failure in the light source device 12. Thus, in the present embodiment, the breakdown of the optical fiber 18 and the wavelength conversion unit 20 can be detected without the addition of new components to the optical system of the light source device 12, so that the increase of the light source device 12 in size can be prevented.

According to the present embodiment, the operation check device 14 has only to be connected to the light signal emitting end 32. The breakdown of the optical fiber 18 and the wavelength conversion unit 20 is detected by the configuration with a high degree of freedom in designing without the addition of new components to the optical system of the light source device 12. It is possible to inhibit any dangerous operation of the light source device 12 in the event of the detection of the breakdown. When no breakdown is detected and the light source device 12 is put into operation, the operation check device 14 is removed and therefore does not affect the operation and usability of the light source device 12.

According to the present embodiment, the determination is based on the detected heat generation, so that breakdown can be detected early under certain conditions. Even if the accuracy of the attachment of the operation check device 14 is not so high, breakdown can be accurately and stably detected. Details of the breakdown (damage) can be analyzed from the heat generation, and proper measures can be taken against the breakdown.

[Tenth Embodiment]

Figure 17:
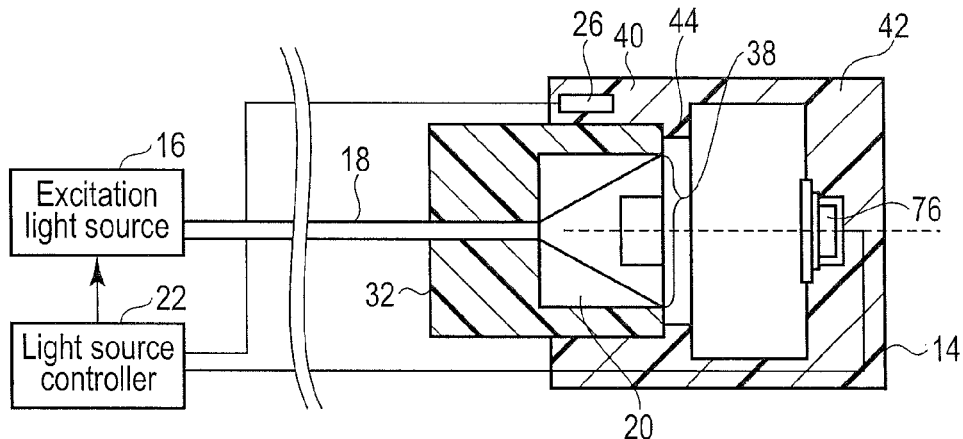
FIG. 17 is a diagram illustrating a configuration example of a wavelength conversion unit and an operation check device in an illumination system according to a tenth embodiment of the present invention.

In an illumination system 10 according to the tenth embodiment, as shown in FIG. 17, a noncontact temperature sensor 76 which optically detects temperature as an infrared temperature sensor is used instead of the contact temperature sensor 70 in the ninth embodiment described above. This noncontact temperature sensor 76 is preferably disposed on the inner surface of a depression in a light blocking cover 42 where a heat generating position can be easily measured. When an operation check device 14 is attached to a light signal emitting end 32, an emission opening 38 of the light signal emitting end 32 is covered with the light blocking cover 42. Therefore, light emitted from the emission opening 38 does not leak out, and the light emitted from the emission opening 38 only enters the noncontact temperature sensor 76, so that the influence of external light can be eliminated. Even if a dangerous level of light is emitted from the emission opening 38 during the determination of the operation of a light source device 12 when the optical output is not yet controlled, the light does not cause damage to, for example, a person outside because the emission opening 38 is covered with the light blocking cover 42.

An advantage of the present embodiment is that the heat insulating material 72 in the ninth embodiment described above is unnecessary because the heat generation and thermal diffusion of the operation check device 14 resulting from the contact with the light signal emitting end 32 do not affect the detection result by the noncontact temperature sensor 76. However, a connector 40 is provided with a projection 44 for alignment as a connection structure to keep a given distance between the noncontact temperature sensor 76 and the light signal emitting end 32.

The connection detector 26 may be provided in the light signal emitting end 32 as in the ninth embodiment, or may be provided in the operation check device 14 as shown in FIG. 17.

[Eleventh Embodiment]

Figure 18:
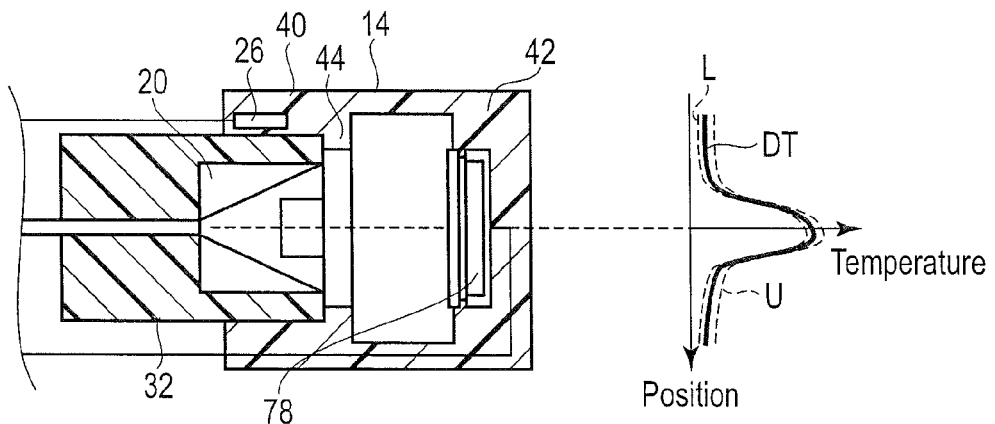
FIG. 18 is a diagram illustrating a configuration example of an operation check device in an illumination system according to an eleventh embodiment of the present invention.

As shown in FIG. 18, an illumination system 10 according to the eleventh embodiment is equipped with a noncontact two-dimensional array temperature sensor 78 capable of measuring a two-dimensional distribution of temperature instead of the noncontact temperature sensor 76 in the tenth embodiment described above.

In this case, a determination circuit 30 determines that it is "safe" or the operation is "proper" if a temperature distribution measured by the noncontact two-dimensional array temperature sensor 78 is located between a predetermined upper limit value and a lower limit value as compared with a distribution obtained from a design value. On the contrary, when a distribution spreads as shown in FIG. 19A as compared with the distribution obtained from the design value or when the center of the distribution is shifted as shown in FIG. 19B, the determination circuit 30 determines that it is "dangerous" or the operation is "improper".

The determination time can be reduced by finding a maximum value from the detection value of the measured temperature distribution and determining by this maximum value rather than by comparing the detection value of the temperature distribution measured by the noncontact two-dimensional array temperature sensor 78 with the distribution obtained from the design value.

In the present embodiment as well, a connection detector 26 may be provided in a light signal emitting end 32, or may be provided in an operation check device 14.

[Twelfth Embodiment]

As shown in FIG. 20, in an illumination system 10 according to the twelfth embodiment, a second temperature sensor 80 is further disposed in a place that is not affected by heat generation in a light signal emitting end 32, in the configuration according to the ninth embodiment. A light source controller 22 determines by the difference between the ambient temperature detected by the second temperature sensor 80 and a detected temperature DT shown by a temperature sensor 70 located in the vicinity of a wavelength conversion unit 20.

For example, the second temperature sensor 80 is attached to a region in an operation check device 14 which is out of contact with the light signal emitting end 32 and to which the signal light emitted from the light signal emitting end 32 is not applied. It should be appreciated that the second temperature sensor 80 is not limited to this position and may be attached to, for example, the outer surface of the operation check device 14.

A more accurate determination can be made by the use of the difference between the ambient temperature and the detected temperature DT.

[Thirteenth Embodiment]

In an illumination system 10 according to the thirteenth embodiment, a plurality of wavelength conversion units 20 are provided in a light signal emitting end 32 of a light source device 12.

For example, as in the second embodiment described above, when three wavelength conversion units 20 are disposed in the light signal emitting end 32, a cutout 56 is provided in the outer periphery of the light signal emitting end 32, and a protrusion 58 to be fitted into the cutout 56 is provided in the inner periphery of a light blocking cover 42 of an operation check device 14, as shown in FIG. 6A and FIG. 6B. In the same manner as the light amount sensor 28 according to the second embodiment described above, a temperature sensor 70 is also located to face each of the wavelength conversion units 20, as shown in FIG. 21. This configuration ensures that the temperature of each of the wavelength conversion units 20 can be detected. When a plurality of wavelength conversion units 20 are provided in this way, a connector 40 preferably has a connection structure that uniquely decides a positional relationship between the temperature sensor 70 and the light signal emitting end 32.

A noncontact two-dimensional array temperature sensor 78 capable of measuring a two-dimensional distribution of temperature may be disposed in contact with the outer periphery of the light signal emitting end 32 to determine by the maximum temperature that is detected.

While the present invention has been described in connection with the embodiments, it should be understood that the invention is not limited to the embodiments described above and various modifications and applications can be made within the spirit of the scope of the present invention.

For example, as in the sixth embodiment, the determination circuit 30 may be provided not within the light source controller 22 but in the operation check device 14 in the other embodiments as well.

In the ninth to thirteenth embodiments as well, information may be transmitted from the operation check device 14 to the light source device 12 by infrared, electromagnetic coupling, or radio wave wireless communication. In this case, the determination circuit 30 which has been disposed in the light source controller 22 is provided in side of the temperature sensor 70 of the operation check device 14, and a determination result is transmitted as the contents of the wireless communication, so that the communication system can be simpler.

The operation check device 14 including a temperature detector such as the temperature sensor 70 may be incorporated in the light source device body 68 which has the excitation light source 16 and the light source controller 22 therein, as in the eighth embodiment described above.

Both a light signal detector such as the light amount sensor 28 and a temperature detector such as the temperature sensor may be used to determine the operations of the excitation light source 16, the optical fiber 18, and the wavelength conversion unit 20, i.e., determine the failure in the light source device 12.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An operation check device for checking an operation of a light source device,
   wherein the light source device comprises:
      a light source configured to emit an excitation light;
      a fluorescent material configured to:
         convert a first portion of the excitation light to an illumination light; and
         emit an emitted light comprising the illumination light and a second portion of the excitation light; and
      a light emitting end defining an emission opening through which the emitted light is emitted to an environment, and
   wherein the operation check device comprises:
      a connector configured to connect to the light emitting end of the light source device;
      an emitted light detector connected to the connector, wherein the emitted light detector is configured to:
         independently detect an amount of the second portion of the excitation light; and
         independently detect an amount of the illumination light; and
      a determination circuit configured to:
         determine a first change of the amount of the second portion of the excitation light detected by the emitted light detector;
         determine a second change of the amount of the illumination light detected by the emitted light detector;
         determine a state of the light source based on the first change and the second change; and
         determine a state of the fluorescent material based on the first change and the second change.

2. The operation check device according to claim 1, further comprising a light blocking cover connected to the connector, wherein the light blocking cover is configured to block the emitted light emitted from the emission opening of the light emitting end from the environment.

3. The operation check device according to claim 2, wherein the emitted light detector is disposed in the light blocking cover.

4. The operation check device according to claim 3, wherein the emitted light detector is disposed at a position of the light blocking cover in front of the light emitting end.

5. The operation check device according to claim 1, wherein the connector is configured to hold the light emitting end and the emitted light detector in a predetermined positional relationship.

6. The operation check device according to claim 5, wherein the connector comprises a connection structure configured to, when the connector is connected to the light emitting end, uniquely decide a positional relationship between the emitted light detector and the light emitting end.

7. The operation check device according to claim 5, wherein the connector comprises a connection structure configured to, when the connector is connected to the light emitting end, keep a given distance between the emitted light detector and the light emitting end.

8. The operation check device according to claim 1, wherein the excitation light is in a first wavelength range and the illumination light is in a second wavelength range different from the first wavelength range, and wherein the emitted light detector is a spectrometric detector configured to detect an intensity of the second portion of the excitation light and to detect an intensity of the illumination light.

9. The operation check device according to claim 1, wherein the operation check device further comprises a wireless transmitter configured to wirelessly transmit the state of the light source and the state of the fluorescent material determined by the determination circuit to the outside of the operation check device.

10. The operation check device according to claim 1, wherein the connector is configured to be removably connected to the light emitting end of the light source device, and wherein the operation check device further comprises a connection detector configured to detect a direct and physical connection between the light emitting end and the connector, wherein the connection detector is configured to perform one or more of electrically detect, optically detect, and electromagnetically detect the direct and physical connection between the light emitting end and the connector.

11. The operation check device according to claim 1, wherein the emitted light detector is configured to measure a light amount distribution.

12. The operation check device according to claim 1, wherein the emitted light detector is configured to detect the emitted light scattered by the optical scattering plate.

13. The operation check device according to claim 1, wherein the connector is configured to be removably connected to the light emitting end of the light source device.

14. The operation check device according to claim 1, wherein the light source device further comprises an optical fiber configured to guide the excitation light emitted by the light source to the fluorescent material, wherein the determination circuit is further configured to determine a state of the optical fiber based on the first change and the second change.

15. The operation check device according to claim 1, wherein the determination circuit is configured to:
determine the first change as a change between the amount of the second portion of the excitation light detected by the emitted light detector and a first predetermined amount; and
determine the second change as a change between the amount of the illumination light detected by the emitted light detector and a second predetermined amount.

16. The operation check device according to claim 1, wherein the determination circuit is configured to:
determine the amount of the second portion of the excitation light detected by the emitted light detector at a first time;
determine the amount of the second portion of the excitation light detected by the emitted light detector at a second time after the first time;
determine the amount of the illumination light detected by the emitted light detector at the first time;
determine the amount of the illumination light detected by the emitted light detector at the second time;
determine the first change as a change between the amount of the second portion of the excitation light detected by the emitted light detector at the first time and the amount of the second portion of the excitation light detected by the emitted light detector at the second time; and
determine the second change as a change between the amount of the illumination light detected by the emitted light detector at the first time and the amount of the illumination light detected by the emitted light detector at the second time.

* * * * *